(12) United States Patent
Jatcko

(10) Patent No.: US 8,477,040 B2
(45) Date of Patent: Jul. 2, 2013

(54) METHOD AND APPARATUS FOR TESTING THE INTEGRITY OF A TANK

(76) Inventor: Joseph D Jatcko, Boulder, CO (US)

( * ) Notice: Subject to any disclaimer, the term of this patent is extended or adjusted under 35 U.S.C. 154(b) by 277 days.

(21) Appl. No.: 13/014,714

(22) Filed: Jan. 26, 2011

(65) Prior Publication Data

US 2012/0188085 A1    Jul. 26, 2012

(51) Int. Cl.
*G08B 21/00* (2006.01)
(52) U.S. Cl.
USPC .......................................... 340/605; 340/626
(58) Field of Classification Search
USPC .................................................. 340/605, 626
See application file for complete search history.

(56) References Cited

U.S. PATENT DOCUMENTS

| | | | |
|---|---|---|---|
| 2,667,068 A | 1/1954 | Viehe | |
| 4,076,585 A | 2/1978 | Cachera | |
| 4,082,664 A * | 4/1978 | Lindstol | 210/793 |
| 4,393,878 A * | 7/1983 | Kahn | 600/561 |
| 4,413,503 A | 11/1983 | Olivieri | |
| 4,462,249 A | 7/1984 | Adams | |
| 4,791,814 A | 12/1988 | Nee | |
| 4,993,256 A * | 2/1991 | Fukuda | 73/49.2 |
| 5,003,813 A | 4/1991 | Hayes | |
| 5,075,877 A | 12/1991 | Jacob | |
| 5,117,677 A | 6/1992 | Hendershot | |
| 5,184,504 A | 2/1993 | Spring | |
| 5,191,870 A * | 3/1993 | Cook | 123/520 |
| 5,216,914 A | 6/1993 | Horner | |
| 5,269,172 A | 12/1993 | Daigle | |
| 5,295,391 A | 3/1994 | Mastandrea | |
| 5,340,238 A | 8/1994 | Tuma | |
| 5,400,646 A | 3/1995 | Kraus | |
| 5,656,766 A | 8/1997 | Horn | |
| 5,987,990 A | 11/1999 | Worthington | |
| 6,059,143 A * | 5/2000 | Weir | 222/61 |
| 6,106,704 A * | 8/2000 | Drewery | 210/86 |
| 6,453,728 B2 | 9/2002 | Messmann | |
| 6,489,894 B2 * | 12/2002 | Berg | 340/605 |
| 2001/0015091 A1 | 8/2001 | Messmann | |
| 2003/0154770 A1 | 8/2003 | Steckler | |
| 2003/0167861 A1 | 9/2003 | Thompson | |
| 2004/0035218 A1 | 2/2004 | Paulson | |
| 2006/0032533 A1 * | 2/2006 | Sheldon | 137/386 |
| 2008/0196482 A1 | 8/2008 | Schelhas | |
| 2009/0007641 A1 | 1/2009 | Haag | |
| 2010/0195991 A1 * | 8/2010 | Deivasigamani et al. | 392/308 |

FOREIGN PATENT DOCUMENTS

WO   WO02086437    * 10/2002
WO   PCT/AU2008/001722    * 11/2007

* cited by examiner

*Primary Examiner* — Daniel Wu
*Assistant Examiner* — Emily C Terrell
(74) *Attorney, Agent, or Firm* — Law Office of Dan Shifrin, PC

(57) ABSTRACT

A system and method for detecting a leak or structural defect in a tank are provided. The system includes a removable test plate to seal an opening in a tank to be tested with all other openings in the tank to be sealed. The system also includes a motor-driven blower or other vacuum-generating device coupled to a first opening in the test plate. When the blower is activated, it generates a vacuum inside the tank of a predetermined value. A vacuum-monitoring device is coupled to a second opening in the test plate and monitors the vacuum in the tank. A leak or structural defect in the tank is indicated if the vacuum decreases from the predetermined value by more than a predetermined differential within a predetermined time.

14 Claims, 6 Drawing Sheets

METHOD AND APPARATUS FOR TESTING THE INTEGRITY OF A TANK

TECHNICAL FIELD

This invention relates generally to testing a tank, such as a precast concrete tank, for leaks and other defects and, in particular, to using a motor-driven blower to generate a vacuum inside the tank.

BACKGROUND ART

Above ground and below ground tanks are used to store or collect any of a number of liquids or liquid-suspended solids. For example, septic tanks are used to collect and process sludge from waste systems. Cisterns are used to collect and hold water. Grease interceptors are used to separate grease from water in restaurant drain systems. There are, of course, numerous other uses.

Such tanks may be fabricated from a number of materials such as, for example, precast concrete or fiberglass, among others. It will be appreciated that tanks must be leak proof and have structural integrity within all of its surfaces. A leak from a cistern may result in the loss of some potable water and a leak in a septic tank or a grease interceptor may cause expensive environmental damage. Consequently, it is important to be able to test a new tank for leaks and structural integrity after it is manufactured but before it is installed as well as test an installed tank that has been in use.

SUMMARY OF THE INVENTION

A system and method for detecting leaks and other defects in a tank are provided. The system includes a removable test plate to seal an opening in a tank to be tested with all other openings in the tank to be sealed. The system also includes a motor-driven blower or other vacuum-generating device coupled to a first opening in the test plate. When the blower is activated, it generates a vacuum inside the tank of a predetermined value. A vacuum-monitoring device monitors the vacuum in the tank created by the blower. A leak in the tank is indicated if the vacuum decreases from the predetermined value by more than a predetermined differential within a predetermined time.

The method includes securing the test plate over an opening in the tank and sealing all other openings. The motor-driven blower or other vacuum-generating device is activated to generate a vacuum of predetermined value inside the tank. The vacuum inside the tank is monitored to determine if the vacuum decreases from the predetermined value by more than a predetermined differential within a predetermined time, thus indicating a leak in the tank.

DETAILED DESCRIPTION OF THE PREFERRED EMBODIMENT

The described features, structures, or characteristics of the invention may be combined in any suitable manner in one or more embodiments. In the following description, specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1A:
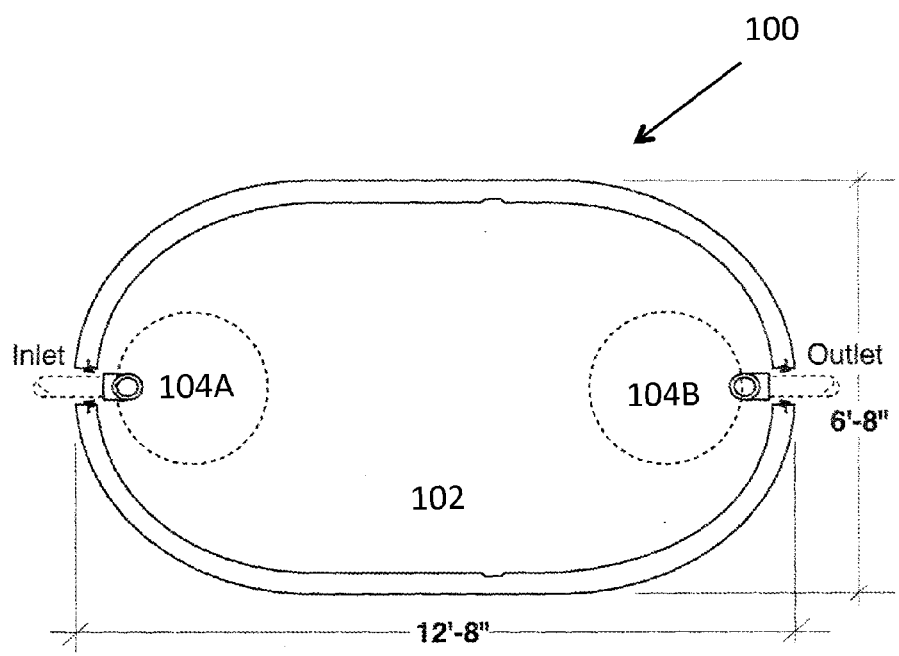
FIGS. 1A and 1B are top and side views of a single-compartment septic tank with which the claimed testing method and system may be used.
Figure 1B:
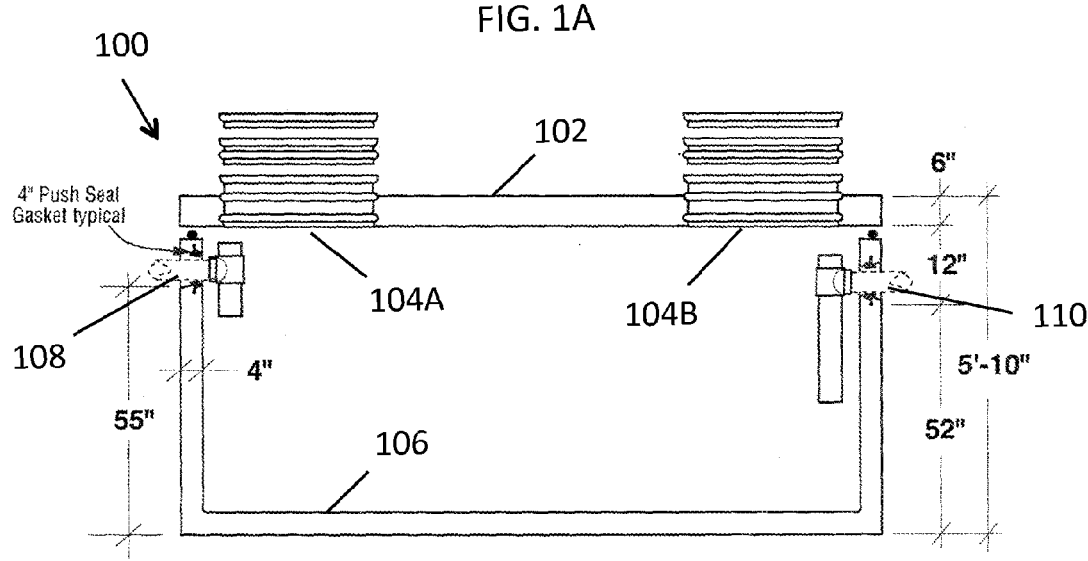

FIGS. 1A and 1B are top and side views of a single-compartment septic tank 100 with which the claimed testing method and system may be used. The tank has a lid 102 with two riser openings 104A, 104B. When installed, the lid 102 is sealed onto the top rim of a body 106. The tank 100 may be fabricated out of precast concrete or any other suitable material, such as fiberglass. The body 106 has an inlet 108 and an outlet 110 through its side-wall. A mid-size, 2,000 gallon concrete septic tank with its lid, such as manufactured and sold by Front Range Precast Concrete, Inc. (FLXX®), might weigh almost 17,000 pounds and have external dimensions of 5'10" high, 12'8" long and 6'8" wide, with 4" thick walls.

Figure 2:
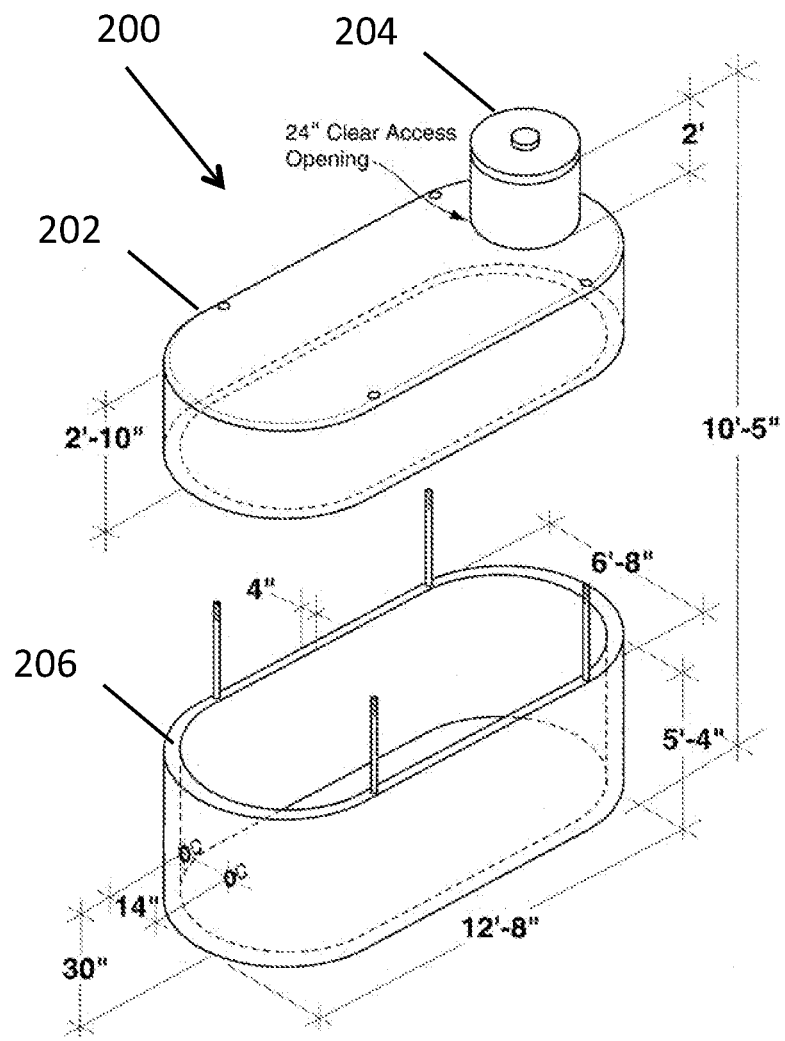
FIG. 2 illustrates a cistern with which the claimed testing method and system may be used.

FIG. 2 illustrates a potable water cistern 200, such as manufactured and sold by FLXX®, with which the claimed testing method and system may be used. The tank 200 has a lid 202 with a riser 204. When installed, the lid 202 is sealed onto the top rim of a body 206 which has two small openings in the side-wall. Again, the tank 200 may be fabricated out of precast concrete or any other suitable material, such as fiberglass. A large, 3,600 gallon cistern with its lid might, such as manufactured and sold by FLXX®, weigh over 20,000 pounds and have external dimensions of 8'2" high, 12'8" long and 6'8" wide, with 4" thick walls.

Figure 3B:
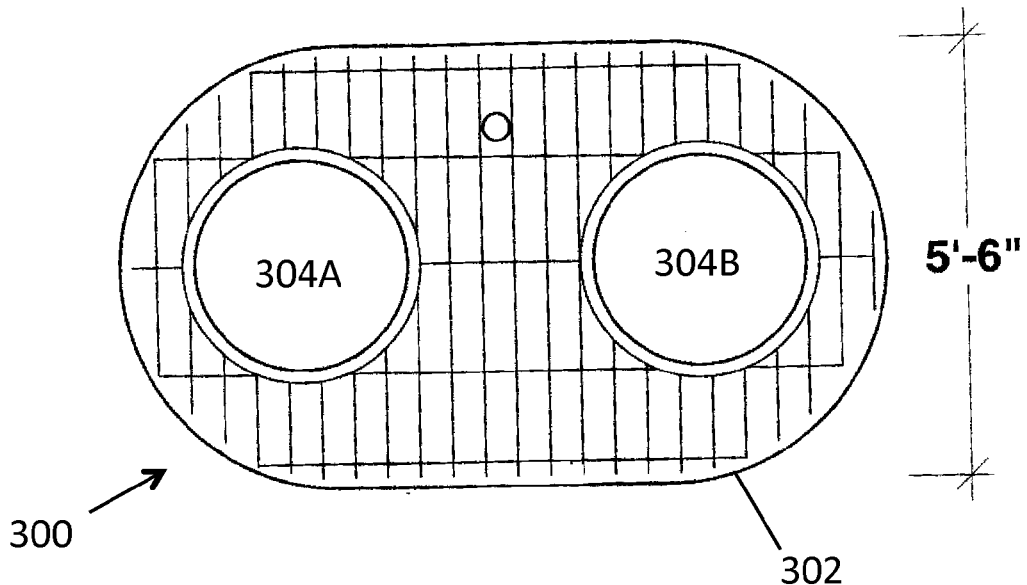
FIGS. 3A and 3B are top and side views of a grease interceptor tank with which the claimed testing method and system may be used.
Figure 3A:
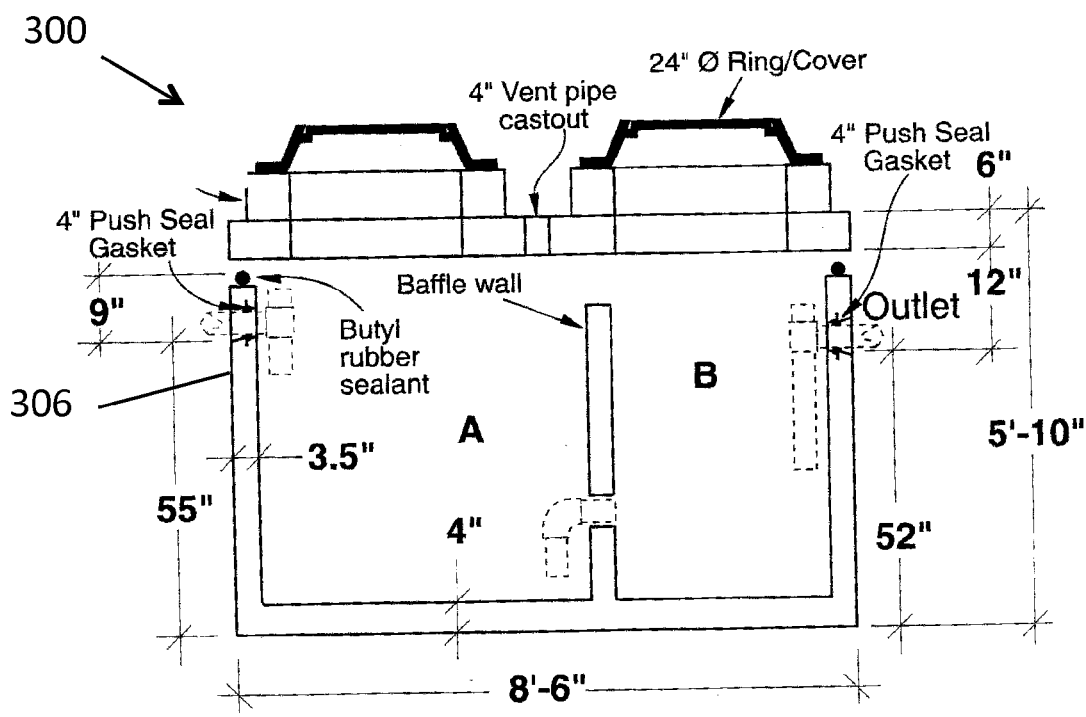

FIGS. 3A and 3B are top and side views of a grease interceptor tank 300 with which the claimed testing method and system may be used. The tank 300 has a lid 302 with openings 304A, 304B. When installed, the lid 302 is secured to the top rim of a body 306. Again, the tank 300 may be fabricated out of precast concrete or any other suitable material, such as fiberglass. A small, 1,000 gallon tank with its lid, such as manufactured and sold by FLXX®, might weigh over 10,000 pounds and have external dimensions of 5'10" high, 8'6" long and 5'6" wide, with 4" thick walls.

It will be understood that each of these types of tanks must be leak proof and should be tested before installation. One method of testing the integrity of a precast concrete tank is hydrostatic testing in which the sealed tank is filled with water and left for eight to ten hours. If the water level has dropped by a measurable amount, the tank is refilled and retested. If the water level again drops, the tank must be repaired and retested or rejected. Additionally, due to the weight of the water inside the tank, the pressure on the sidewalls will be greater at the bottom of the tank than at the top and leaks near the top will be less likely to be detected than those near the bottom. Clearly, hydrostatic testing is inconvenient and potentially inaccurate as well as being time consuming. Further, hydrostatic testing is difficult to perform after a tank has been installed.

Another method of testing the integrity of a precast concrete tank is vacuum testing in which the tank is sealed and subjected to a vacuum of, for example, about 4 inches (100 mm) of mercury. The vacuum must not drop more than about ½ inch (13 mm) of mercury in five minutes. If is does, then the vacuum is reapplied for another five minutes and the tank retested.

Figure 4:
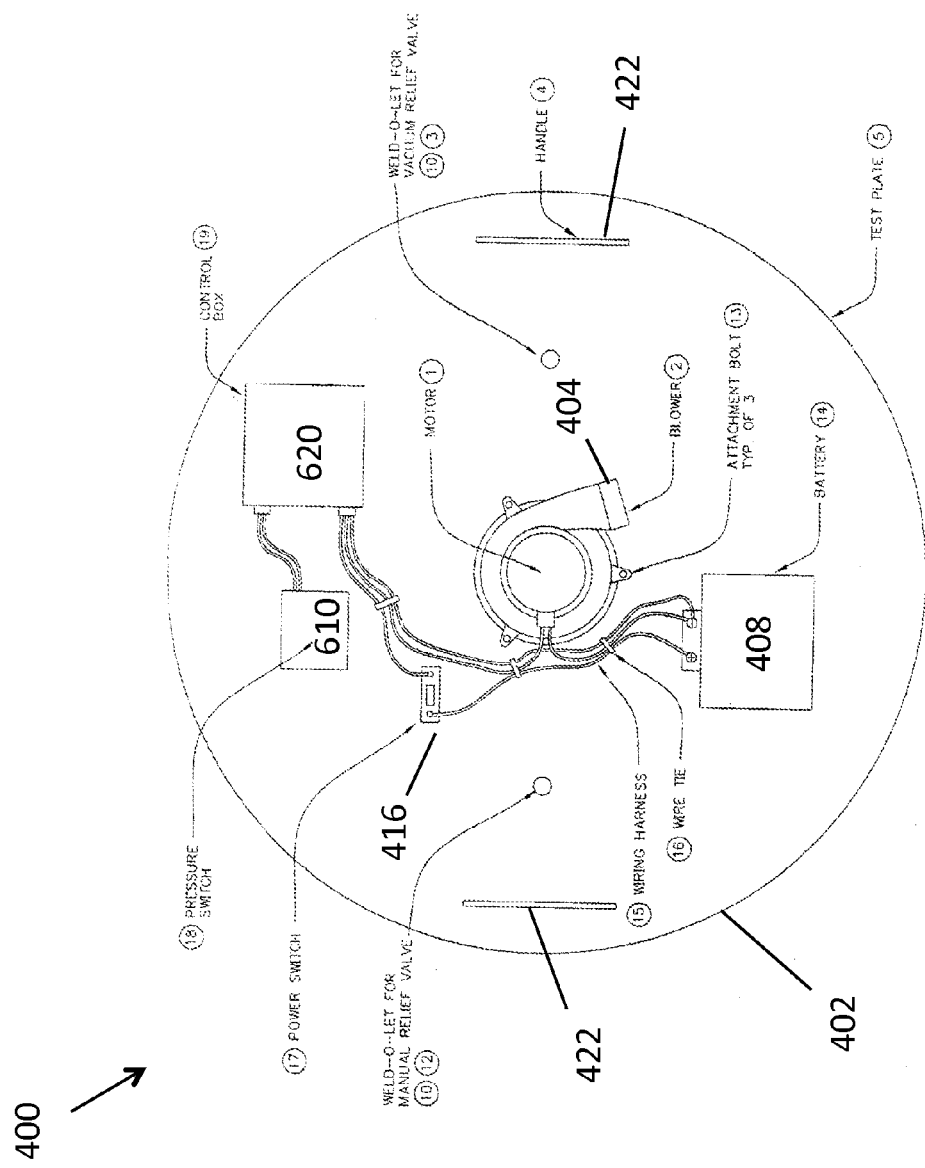
FIG. 4 is a top view of the claimed test system.
Figure 5:
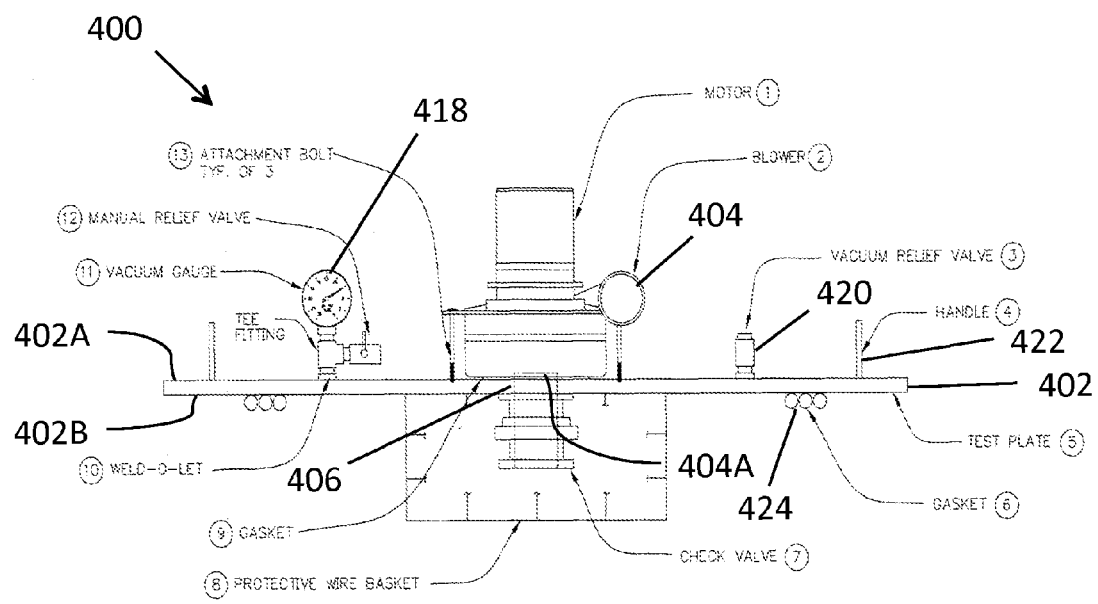
FIG. 5 is a side view of the claimed test system.

FIGS. 4 and 5 are top and side views of an embodiment of the claimed testing system 400. The system 400 includes a test plate 402 which is dimensioned to fit over an opening in the tank to be tested, such as a riser opening. The test plate 402 may be constructed of metal, such as steel, or significantly lighter plywood having sufficient thickness or bracing to withstand the vacuum that is generated inside tanks to be tested. The system 400 also includes a motor-driven blower 404, preferably a multi-stage turbine blower which can generate the required vacuum in less time than other types of vacuum generating devices. In the embodiment illustrated, the blower 404 is mounted on the upper side 402A of the test plate; that is, the side of the test plate 402 that will be outside of the tank. With the blower 404 mounted on the upper side 402A of the test plate, an inlet 404A of the blower 404 is coupled to an opening 406 in the test plate. If the blower 404 is mounted on the opposite side (underside) 402B of the test plate, an outlet of the blower 404 is coupled to the opening 406. Either way, the blower 404 is coupled to the opening of the test plate in such a way as to be able to generate a vacuum within the tank. The blower 404 may be a vacuum cleaner blower powered by a 24 or 36 volt DC motor. One such combination is a two-stage model 491.3.405 from Domel which is suitable for wet and dry applications, has an airflow of up to 81 cubic feet per minute and is capable of producing the required vacuum with an inlet diameter of 1.5 inches. In tests of the system 400, a 2000 gallon tank was evacuated to 4 inches of mercury in less than one minute. It will be appreciated that the Domel blower is merely representative of blowers may be used with the system 400 and that other models from other manufacturers may be used instead. It will also be appreciated that types of vacuum-generating devices other than motor-driven blowers may also be used.

For a DC blower motor and the circuitry of the tester, a rechargeable battery 408, such as a lithium-ion battery having a capacity of 12,600 milliamp-hours, may be used and provides portability to the testing system 400. If desired, extra batteries may be kept with the system 400 if it is anticipated that the battery 408 may run down before it can be recharged. An appropriate battery charger will be used to recharge the battery 408. For additional convenience, a charger may also be used that is powered by a vehicle battery to enable the battery or batteries to be recharged en route to a test site. It will be appreciated that other types of batteries may be used. For example, two 12 or 18 volt rechargeable batteries and chargers of the type used for cordless power tools have sufficient power, are convenient and are relatively inexpensive. It will also be appreciated that AC power may be used for non-portable, single-site testing, such as at a manufacturing facility.

Figure 6:
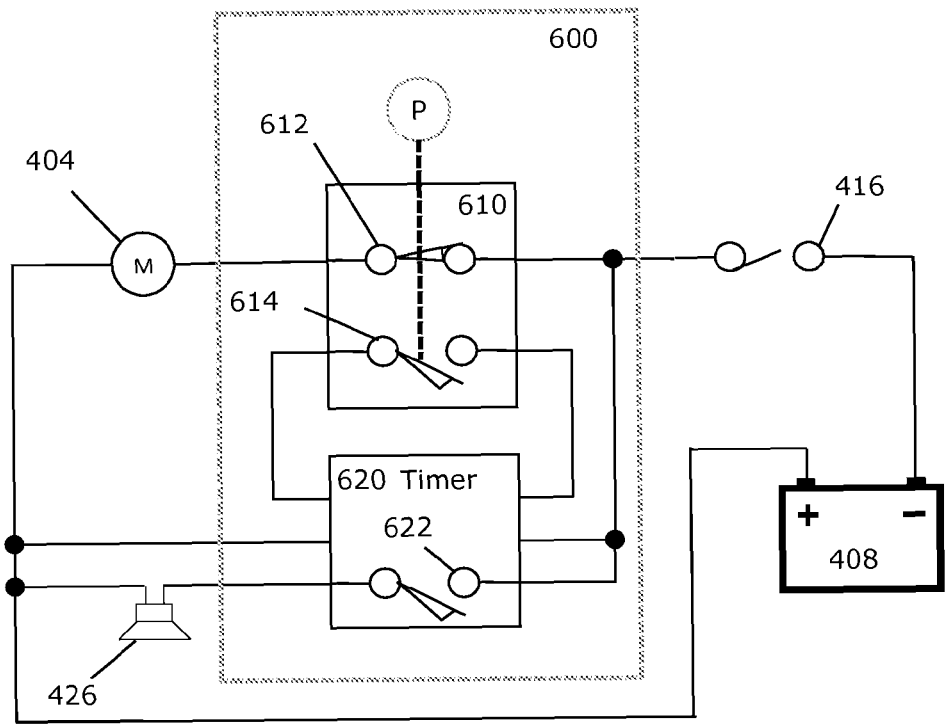
FIG. 6 is a wiring diagram of one embodiment of the claimed test system.

The system also includes a vacuum monitoring device 600. As illustrated in FIG. 6, the vacuum monitoring device 600 may include a pressure-sensing switch 610 and a timing controller 620. The pressure-sensing switch 610 may be any device which can detect a vacuum of a predetermined value, such as 4 inches (100 mm) of mercury. In one embodiment, a second pressure sensing switch 730 may be used to detect a predetermined differential, such as ½ inch (13 mm) of mercury (see FIG. 7). The pressure-sensing switch 610 may have fixed settings or, for versatility, be of an adjustable type. For example, the model RH-3 from Kele is an adjustable differential pressure switch within these specifications having a diaphragm and a lever-operated switch with both normally-open and normally-closed contacts. When a vacuum of a predetermined value is applied to the "low" side of the diaphragm, the diaphragm moves the switch lever.

The testing system 400 may also include a power switch 416, a vacuum gauge 418 (FIG. 5), and a vacuum relief valve 420 (FIG. 5). Appropriate openings drilled in the test plate 402 accommodate the vacuum gauge 418 and relief valve 420. Additionally, handles 422 may be secured to the test plate 402 for convenience in carrying the system 400. To improve the seal between the test plate 402 and the rim of the tank being tested, a gasket 424 of appropriate shape and diameter may be secured to the underside of the test plate 402. If desired, several gaskets of varying sizes and shapes may be secured to the test plate 402 so that the system 400 is able to accommodate a variety of tanks with different size and shaped openings.

FIG. 6 is a wiring diagram of one embodiment of the system 400. In operation, a test is begun by fitting the test plate 402 over an opening in a tank to be tested and sealing all other openings, such as inlets and outlets. The power switch 416 is closed and power applied from the battery 408 or AC source to the motor of the blower 404 through the normally closed contacts 612 of the pressure-sensing switch 610. When a vacuum of the desired value has been achieved within the tank, the normally closed contacts 612 of the switch 610 open, cutting off power to the motor and turning off the blower 404. Simultaneously, the normally open contacts 614 of the switch 610 close, activating the timer controller 620. After a predetermined time has elapsed, such as five minutes, the timing controller 620 activates an indicator, such as a horn 426 or a light through normally open contacts 622. (The time may also be monitored manually with a stopwatch.) At the end of the predetermined time, the pressure gauge 418 is viewed to determine whether the vacuum has decreased by more than the predetermined differential, such as ½ inch (13 mm) of mercury, indicating a possible leak or defect. If the tank has maintained the vacuum, it is be certified as having passed the test. If the vacuum has decreased by more than the predetermined differential, the tank is examined for leaks and structural defects or weaknesses. The tank is repaired if possible and retested.

Figure 7:
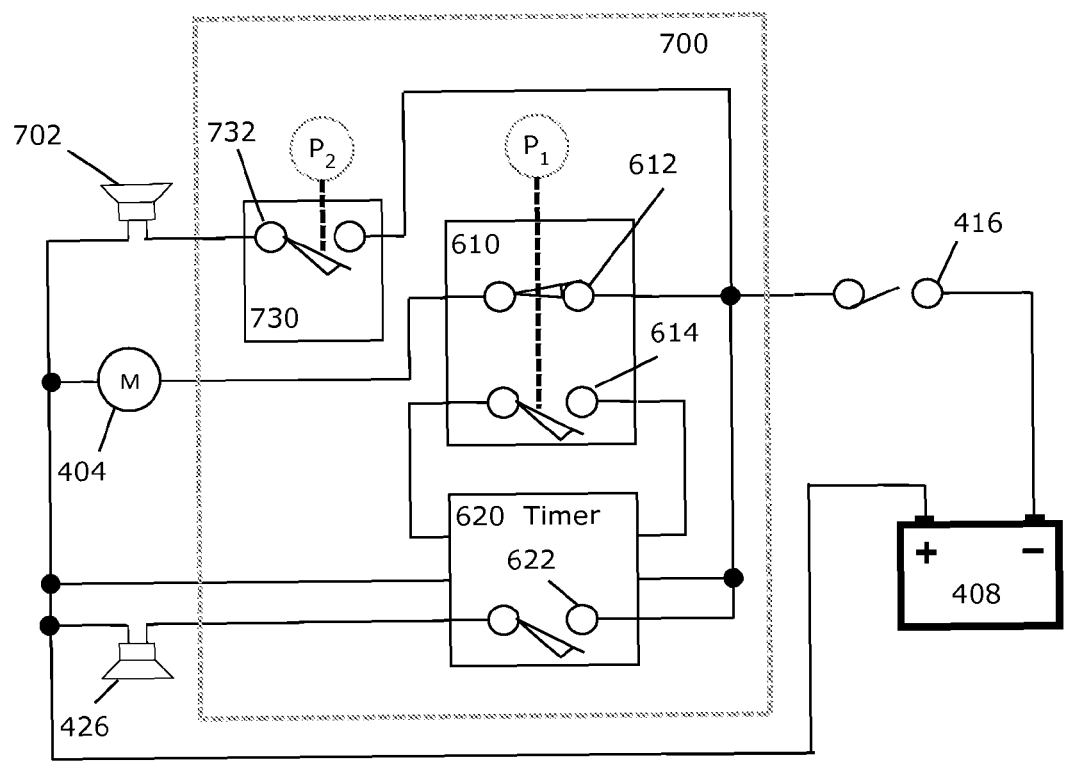
FIG. 7 is a wiring diagram of another embodiment of the claimed test system.

The embodiment of FIG. 7 is more automated with the vacuum monitoring device 700 also including a second pressure switch 730 capable of detecting a predetermined differential, such as ½ inch (13 mm) of mercury. If, during the test, the vacuum inside the tank decreases by more than the predetermined differential, indicating a possible leak or defect, normally open contacts 732 on the second pressure switch 730 close to activate a second indicator 702, such as a horn or light. Although the pressure gauge 418 is not necessary in the embodiment of FIG. 7, it may still be included in the system for visual verification.

One method of repairing the tank after a leak has been detected and identified is by applying a sealant to the outside of the tank at the location of the leak. The testing system 400 is then activated to apply a vacuum to the inside of the tank to draw the sealant into the leak. After the system 400 is turned off, the sealant is allowed to cure after which the tank may be retested. Any of a number of known concrete seal and epoxies may be used to repair a leak.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for detecting a defect in a tank, comprising:
   a removable test plate to seal an opening in a tank to be tested, all other openings in the tank being sealed;
   a motor-driven blower coupled to a first opening in the test plate to generate a vacuum of a predetermined value inside the tank; and
   a vacuum-monitoring device coupled to a second opening in the test plate and operable to monitor the vacuum in the tank generated by the blower, whereby a defect in the tank is indicated if the vacuum decreases from the predetermined value by more than a predetermined differential within a predetermined time.

2. The system of claim 1, wherein the vacuum-monitoring device comprises:
   a vacuum gauge; and
   an indicator activated after the predetermined time whereupon a determination may be made from the vacuum gauge whether the vacuum inside the tank has decreased by more than the predetermined differential.

3. The system of claim 1, wherein the vacuum-monitoring device comprises a first pressure switch operable to detect when the vacuum reaches the predetermined value.

4. The system of claim 3, wherein the first pressure switch comprises:
   a first adjustable differential pressure switch having a setting equal to the predetermined value; and
   an electrical switch coupled to the blower and responsive to the first adjustable differential pressure switch to turn off power to the blower when the vacuum inside the tank reaches the predetermined value.

5. The system of claim 4, wherein the monitoring device further comprises:
   a second pressure switch to detect a decrease in the vacuum of the predetermined differential; and
   an indicator activated by the second pressure switch to indicate if the vacuum has decreased by the predetermined differential.

6. The system of claim 5, wherein the second pressure switch comprises a second adjustable differential pressure switch having a setting equal to the predetermined value minus the predetermined differential.

7. The system of claim 1, wherein the vacuum-monitoring device comprises a pressure switch capable of detecting a decrease in the vacuum of the predetermined differential.

8. The system of claim 7, wherein the pressure switch comprises an adjustable differential pressure switch having a first setting equal to the predetermined value and a second setting equal to the predetermined value minus the predetermined differential.

9. The system of claim 8, further comprising an indicator functionally coupled to the pressure switch to generate an indication if the vacuum inside the tank decreases by the predetermined differential within the predetermined time.

10. The system of claim 1, wherein the vacuum monitoring device comprises:
    a first pressure switch having a first setting equal to the predetermined value;
    an electrical switch coupled to the blower and responsive to the first pressure switch to turn off power to the blower when the vacuum inside the tank reaches the predetermined value;
    a second pressure switch to detect a decrease in the vacuum of the predetermined differential; and
    an indicator activated by the second pressure switch if the vacuum has decreased by the predetermined differential.

11. The system of claim 1, further comprising a power supply coupled to the blower and to the vacuum-monitoring device whereby the power supply provides power to the blower after being activated to create the vacuum in the tank until the vacuum equals the predetermined value after which the power supply terminates power to the blower.

12. The system of claim 11, wherein the power supply comprises a rechargeable battery.

13. A method for detecting a defect in a tank, comprising:
    securing a test plate over an opening in a tank;
    sealing all other openings in the tank;
    activating a motor-driven blower to generate a vacuum of a predetermined value inside the tank; and
    monitoring the vacuum inside the tank to determine if the vacuum decreases from the predetermined value by more than a predetermined differential within a predetermined time.

14. The method of claim 13, wherein the step of activating the blower comprises applying power to the blower from a rechargeable battery.

* * * * *